United States Patent [19]  
Krapcho et al.

[11] 3,911,129  
[45] Oct. 7, 1975

[54] PYRAZOLO-PYRIDINE BIOLOGICALLY ACTIVE COMPOUNDS

[75] Inventors: John Krapcho, Somerset; Chester Frank Turk, Kendall Park, both of N.J.

[73] Assignee: E. R. Squibb & Sons, Inc., Princeton, N.J.

[22] Filed: July 1, 1974

[21] Appl. No.: 484,730

[52] U.S. Cl. ............ 424/256; 424/263; 260/240 F
[51] Int. Cl. ........................................ C07d 57/04
[58] Field of Search ............... 260/240 F; 424/256

[56] References Cited
UNITED STATES PATENTS
3,804,773  4/1974  Siegrist .................. 260/240 D X
3,852,279  12/1974  Krapcho et al. ............ 260/240 F

*Primary Examiner*—Allen B. Curtis
*Attorney, Agent, or Firm*—Lawrence S. Levinson; Merle J. Smith; Burton Rodney

[57] ABSTRACT

Compounds of the formula

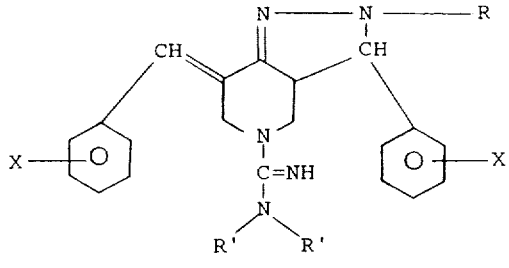

I have been found to possess CNS and anti-inflammatory activity.

4 Claims, No Drawings

PYRAZOLO-PYRIDINE BIOLOGICALLY ACTIVE COMPOUNDS

OBJECTS OF THE INVENTION

It is an object of the present invention to provide novel compounds which possess CNS depressant activity and anti-inflammatory activity. Another object is to provide a method for preparing these compounds. These and other objects of the present invention will be apparent from the following description.

SUMMARY OF THE INVENTION

The present invention is directed to compounds of the formula

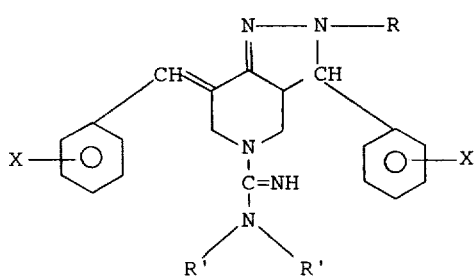

wherein X is F, Cl, lower alkyl, lower alkoxy, or $CF_3$; R is H, alkyl, phenyl lower alkyl, X-substituted phenyl lower alkyl, hydroxy lower alkyl or lower alkanoyl; and R' is hydrogen or lower alkyl. The foregoing compounds possess CNS depressant activity and anti-inflammatory activity.

DETAILED DESCRIPTION

The compounds of the present invention have the following structural formula

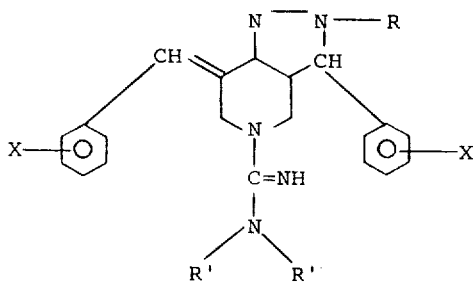

I wherein X is F, Cl, $CF_3$, alkyl of from 1 to 4 carbon atoms or alkoxy of from 1 to 4 carbon atoms, wherein each X-substituted phenyl group may be the same or different; R is H, alkyl of from 1 to 4 carbon atoms, phenyl lower alkyl or X-substituted phenyl lower alkyl wherein X is as defined above and the alkyl group is from 1 to 4 carbon atoms, hydroxy lower alkyl of from 1 to 4 carbon atoms or alkanoyl of from 1 to 4 carbon atoms; and R' is hydrogen or alkyl of from 1 to 4 carbon atoms wherein each R' may be the same or different.

The compounds of the present invention are prepared by reacting 4-piperidone II, or preferably an N-acyl derivative thereof, e.g., the N-acetyl or N-benzoyl derivative, with an aldehyde of the formula

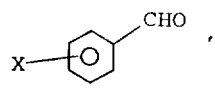

wherein X is as previously defined, utilizing the procedure described in the Journal of the American Chemical Society, 70, 1824 (1948), which is incorporated by reference, to yield compounds of formula III.

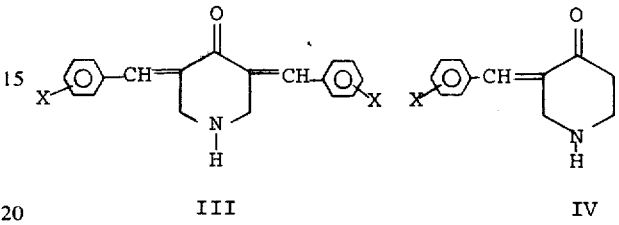

By adjusting the ratio of reactants so as to have an excess of the compounds of formula II present, a compound of formula IV is obtained. A compound of formula III wherein each benzylidene substituent is different is prepared by reacting a compound of formula IV with an aldehyde different from that used to form the compound of formula IV.

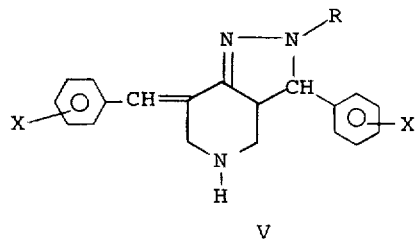

V

The compounds of formula III are generally isolated in the form of their acid addition salts.

A compound of formula III, preferably an acid-addition salt such as the hydrochloride salt, and so forth, is converted to a compound of formula V by reaction with a hydrazine of the formula $H_2NNHR$, wherein R is hydrogen, alkyl of from 1 to 4 carbon atoms, hydroxy alkyl wherein the alkyl group has from 1 to 4 carbon atoms, phenylalkyl wherein the alkyl group has 1 or 4 carbon atoms, or X-substituted phenylalkyl wherein the alkyl group has 1 or 4 carbon atoms and wherein X is as defined above. This reaction takes place in a polar organic solvent, preferably a water miscible alcohol at a temperature of from about 40°C to about 120°C, preferably at about the reflux temperature of the solvent for from about ½ hour to about 12 hours, preferably from about 2 to about 6 hours. The resulting compounds of formula V are generally purified in the form of a mono- or di- acid addition salt. A compound of formula V wherein R is alkanoyl of from 1 to 4 carbon atoms is prepared by acylating a compound of formula I wherein R is hydrogen employing conventional acylating agents under known conditions, for example an acylating agent such as acetic anhydride or propionyl chloride and the like in an inert solvent, such as benzene, toluene, ether or tetrahydrofuran and so forth.

The hydrazine of formula $H_2NNHR$ may be prepared according to known techniques, for example, by reacting chloramine, $NH_2Cl$, with an amine of the formula $RNH_2$.

A compound of formula I may be converted to its N-oxide by reaction with an oxidizing agent such as hydrogen peroxide, peracetic acid and so forth.

A compound of formula I wherein each R' is H is prepared by reacting a compound of formula I with cyanamide. A compound of formula I wherein one R' is hydrogen and the other is alkyl of 1 to 4 carbons is obtained by reacting a compound of formula V with N,S-dialkylthiopseudourea hydroiodide. A compound of formula I wherein each R' is alkyl of from 1 to 4 carbons is obtained by reacting a compound of formula V with dialkyl cyanamide.

The compounds of the present invention, their N-oxides, and their non-toxic pharmaceutically acceptable mono- or di-acid addition salts are useful as central nervous system depressants in mammalian species, e.g., rats and mice, when administered in amounts ranging from about 0.5 mg/kg to about 10.0 mg/kg of body weight per day. A preferred dosage regimen for optimum results is from about 1 mg to about 5 mg per kg of body weight per day, and such dosage units are employed that a total of about 35 mg to about 7 g of active ingredient are administered in a 24-hour period for a subject of about 70 kg body weight.

The compounds of the present invention in the described dosages may be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. The amount of active compound in such therapeutically useful compositions or preparations is such that a suitable dosage will be obtained.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup of elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The following examples illustrate the present invention, without, however, limiting the same thereto. All temperatures are expressed in degrees Centigrade.

EXAMPLE 1

2,3,4a,4,6,7-hexahydro-2-methyl-3-phenyl-7-(phenylmethylene)-5H-pyrazolo[4,3-c]pyridine-5-carboximamide hydrochloride A. 3,5-dibenzylidine-4-piperidone, hydrochloride 14 g (0.1 mole) of N-acetyl-4-piperidone and 32 g (0.3 mole) of benzaldehyde in 150 ml of ethanol is cooled to 15° and treated dropwise with 33 ml of concentrated HCl, refluxed for 6 hours, and stored overnight at room temperature. The light yellow solid is filtered, washed with ethanol, then with ether and air-dried, weight 26 g (83%) mp. 273°–275° (dec.).

B. 7-benzylidine-3,3a,4,5,6,7-hexahydro-2-methyl-3-phenyl-2H-pyrazolo-[4,3-c]pyridine, hydrochloride The product from A (9.5 g, 0.0305 mole) and 1.5 g (0.032 mole) of methylhydrazine in 200 ml of methanol is heated and the resulting solution refluxed for 4 hours. The solvent is removed on a rotary evaporator to yield a solid residue which on trituration with ether and cooling gives 9.5 g (92%) of the title compound, mp 210°–212°. Following crystallization from 250 ml of ethanol, the light yellow material weighs 6.0 g (58%), mp 218°–220°.

C. 2,3,4a,4,6,7-hexahydro-2-methyl-3-phenyl-7-(phenylmethylene)-5H-pyrazolo[4,3-c]pyridine-5-carboximamide hydrochloride A stirred mixture of 8.0 g (0.024 mole) of 7-benzylidine-3,3a,4,5,6,7-hexahydro-2-methyl-3-phenyl-2H-pyrazolo-[4,3-c]-pyridine, hydrochloride and 8.0 g of cyanamide in 350 ml of ethanol is heated and the resulting solution refluxed for 24 hours. The bulk of the ethanol is removed on a rotary evaporator and the residue triturated with ether to precipitate a yellow syrupy product which slowly crystallizes on rubbing and storing in the cold. The somewhat tacky material is filtered, washed with ether and stirred with 200 ml of boiling acetonitrile. The solid which separates is filtered after cooling overnight, washed with acetonitrile and ether, and dried in vacuo to yield 5.5 g (61%) of the title compound, mp 212°–214°. Following crystallization from a mixture of 40 ml of methanol and 200 ml of ether the cream colored solid weighs 4.6 g (51%), mp 212°–214°.

EXAMPLES 2–12

Following the procedure of example 1 but substituting for benzaldehyde in part A, the compound indicated in column I, there is obtained the corresponding compound of formula I wherein each X, and its position, is as indicated in column II:

| Example | I | II |
|---|---|---|
| 2. | o-chlorobenzaldehyde | 2-chloro |
| 3. | p-chlorobenzaldehyde | 4-chloro |
| 4. | p-fluorobenzaldehyde | 4-fluoro |
| 5. | 2-methylbenzaldehyde | 2-methyl |
| 6. | 3-methylbenzaldehyde | 3-methyl |
| 7. | 4-methylbenzaldehyde | 4-methyl |
| 8. | 2-methoxybenzaldehyde | 2-methoxy |
| 9. | 3-methoxybenzaldehyde | 3-methoxy |
| 10. | 4-methoxybenzaldehyde | 4-methoxy |
| 11. | 4-butoxybenzaldehyde | 4-butoxy |
| 12. | 3-trifluoromethylbenzaldehyde | 3-trifluoromethyl |

EXAMPLES 13–30

Following the procedure of example 1 but substituting for methylhydrazine in part B, the compound indicated in column I, there is obtained the corresponding compound of formula I wherein R is the group indicated in column II:

| Ex. | I | II |
|---|---|---|
| 13. | ethylhydrazine | ethyl |
| 14. | propylhydrazine | propyl |
| 15. | isopropylhydrazine | isopropyl |
| 16. | isobutylhydrazine | isobutyl |
| 17. | butylhydrazine | butyl |
| 18. | (2-hydroxyethyl)hydrazine | 2-hydroxyethyl |
| 19. | 1,2-dihydroxy-3-hydrazinopropane | 1,2-dihydroxypropyl |
| 20. | benzylhydrazine | benzyl |
| 21. | phenethylhydrazine | phenethyl |
| 22. | o-fluorobenzylhydrazine | o-fluorobenzyl |
| 23. | m-chlorophenylethylhydrazine | m-chlorophenylethyl |
| 24. | p-trifluoromethylbenzylhydrazine | p-trifluoromethylbenzyl |
| 25. | m-methylbenzylhydrazine | m-methylbenzyl |
| 26. | o-ethylphenethylhydrazine | o-ethylphenethyl |
| 27. | m-methoxybenzylhydrazine | m-methoxybenzyl |
| 28. | p-ethoxyphenylethylhydrazine | p-ethoxyphenethyl |
| 29. | acetylhydrazine | acetyl |
| 30. | hydrazine | hydrogen |

EXAMPLE 31

2,3,4a,4,6,7-hexahydro-N,2-dimethyl-3-phenyl-7-(phenylmethylene)-5H-pyrazolo[4,3-c]pyridine-5-carboximamide hydroiodide A mixture of 2.0 g of the free base of the product from Part B of example 1, 1.5 g of N,S-dimethylthiopseudourea hydroiodide (prepared according to the procedure of Bull. Soc. Chim. France, 1960, 387) and 30 ml of dimethylformamide is refluxed for 2 hours. The solution is then cooled and the solvent removed under reduced pressure. The residue is triturated with ether to give the title compound.

EXAMPLE 32

2,3,4a,4,6,7-hexahydro-N,N,2-trimethyl-3-phenyl-7-(phenyl-methylene)-5H-pyrazolo[4,3-c]pyridine-5-carboximamide hydrochloride A mixture of 2.0 g of the hydrochloride salt from Part B of example 1, 3.0 g of dimethylcyanamide prepared according to the procedure of Chem. Ber. 93 621 (1960) and 15 ml of dimethylformamide is refluxed for 20 hours. The resulting solution is diluted with ether to give the title compound.

EXAMPLE 33

2,3,4a,4,6,7-hexahydro-2-methyl-3-phenyl-7-(phenylmethylene)-5H-pyrazolo[4,3-c]pyridine-5-carboximamide, N-oxide A solution of the free base of the product of example 1 in acetic acid is treated with an equivalent quantity of 30% hydrogen peroxide and the solution then heated at 80°–90° for 1 hour and cooled. The solvent is then removed on a rotary evaporator at reduced pressure to yield the title compound.

EXAMPLE 34

Preparation of capsule formulation

| Ingredient | Milligrams per Capsule |
|---|---|
| 2,3,4a,4,6,7-hexahydro-2-methyl-3-phenyl-7-(phenylmethylene)-5H-pyrazolo[4,3-c]pyridine-5-carboximamide hydrochloride | 400 |
| Starch | 80 |
| Magnesium stearate | 5 |

The active ingredient, starch and magnesium stearate are blended together. The mixture is used to fill hard shell capsules of a suitable size at a full weight of 485 milligrams per capsule.

EXAMPLE 35

Preparation of tablet formulation

| Ingredient | Milligrams per Tablet |
|---|---|
| 2,3,4a,4,6,7-hexahydro-N,2-dimethyl-3-phenyl-7-(phenylmethylene)-5H-pyrazolo-[4,3-c]pyridine-5-carboximamide hydroiodide | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 milligrams of active ingredient.

EXAMPLE 36

Preparation of oral syrup formulation

| Ingredient | Amount |
|---|---|
| 2,3,4a,4,6,7-hexahydro-2-methyl-3-phenyl-7-(phenylmethylene)-5H-pyrazolo[4,3-c]pyridine-5-carboximamide, N-oxide | 500 mg. |
| Sorbitol solution (70% N.F.) | 40 ml. |
| Sodium benzoate | 150 mg. |
| Sucaryl | 90 mg. |
| Saccharin | 10 mg. |
| Red Dye (F.D. & Co. No. 2) | 10 mg. |
| Cherry flavor | 50 mg. |
| Distilled water qs to | 100 ml. |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphate, citrates or tartrates may be added as buffers. Preservatives may include the parabens, sorbic acid and the like and other flavors and dyes may be used in place of those listed above.

What is claimed is:

1. A compound of the formula

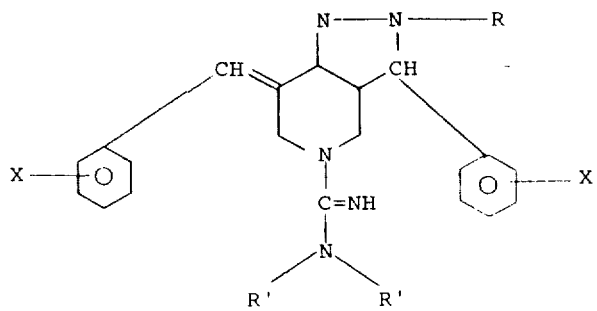

wherein X is F, Cl, alkyl of from 1 to 4 carbon atoms, H, alkoxy of from 1 to 4 carbon atoms, or $CF_3$; R is hydrogen, alkyl of from 1 to 4 carbon atoms, phenyl alkyl wherein the alkyl group is from 1 to 4 carbon atoms or X-substituted phenyl alkyl wherein X is as previously defined and the alkyl group is from 1 to 4 carbon atoms, hydroxy alkyl of from 1 to 4 carbon atoms or alkanoyl of from 1 to 4 carbon atoms; and R' is hydrogen or alkyl of from 1 to 4 carbon atoms; and N-oxides and pharmaceutically acceptable acid addition salts thereof.

2. A compound of claim 1 having the name 2,3,4a,4,-6,7-hexahydro-2-methyl-3-phenyl-7-(phenylmethylene)-5H-pyrazolo-[4,3-c]pyridine-5-carboximamide hydrochloride.

3. A compound of claim 1 wherein each X is hydrogen, R is methyl and each R' is hydrogen.

4. A composition comprising a compound of claim 1 in combination with a pharmaceutically acceptable carrier.

* * * * *

UNITED STATES PATENT AND TRADEMARK OFFICE
CERTIFICATE OF CORRECTION

PATENT NO. : 3,911,129
DATED : October 7, 1975
INVENTOR(S) : John Krapcho et al.

It is certified that error appears in the above-identified patent and that said Letters Patent are hereby corrected as shown below:

Column 2, before structure III, insert the following:

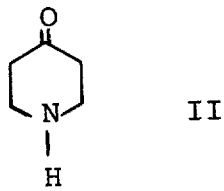

II

Column 2, line 23, "compounds" should read --compound--.

Signed and Sealed this third Day of February 1976

[SEAL]

Attest:

RUTH C. MASON
Attesting Officer

C. MARSHALL DANN
Commissioner of Patents and Trademarks